(12) United States Patent
Baum

(10) Patent No.: US 6,188,779 B1
(45) Date of Patent: Feb. 13, 2001

(54) DUAL PAGE MODE DETECTION

(75) Inventor: Stephen R. Baum, Needham, MA (US)

(73) Assignee: L&H Applications USA, Inc., Burlington, MA (US)

(*) Notice: Under 35 U.S.C. 154(b), the term of this patent shall be extended for 0 days.

(21) Appl. No.: 09/223,428

(22) Filed: Dec. 30, 1998

(51) Int. Cl.$^7$ .................................................. G06K 9/00
(52) U.S. Cl. ............................................................ 382/114
(58) Field of Search ..................................... 382/100, 114, 382/173, 174, 175, 176, 282, 289, 290; 340/825.21; 348/62, 195, 218; 705/517, 520, 521

(56) References Cited

U.S. PATENT DOCUMENTS 5,774,580 * 6/1998 Saitoh .................................... 382/176

* cited by examiner

*Primary Examiner*—Andrew W. Johns
*Assistant Examiner*—Shervin Nakhajvan
(74) *Attorney, Agent, or Firm*—Bromberg & Sunstein LLP

(57) ABSTRACT

A method of correcting an image file produced by scanning a document is described. The method includes determining probable regions of text from an image file containing an image of a left page and a right page of a document and determining a page boundary between the regions of text. The method splits the image file about the determined page boundary into two separate image files corresponding to an image of the left hand page and the right hand page. The method can be implemented as a computer program product residing on a computer readable medium for separating an image file containing a pair of pages into separate image files of each page.

38 Claims, 9 Drawing Sheets

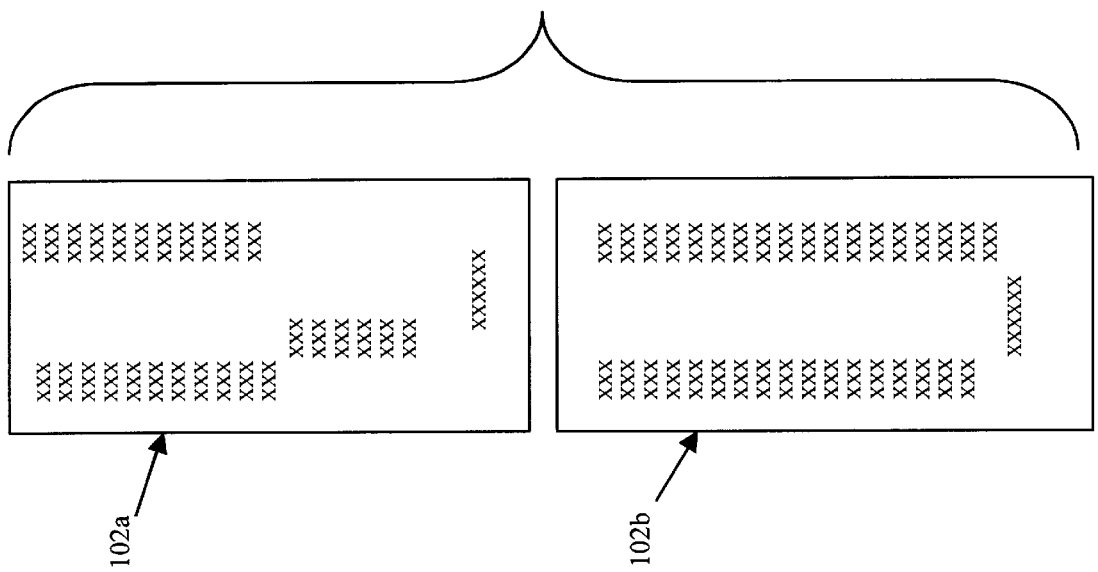
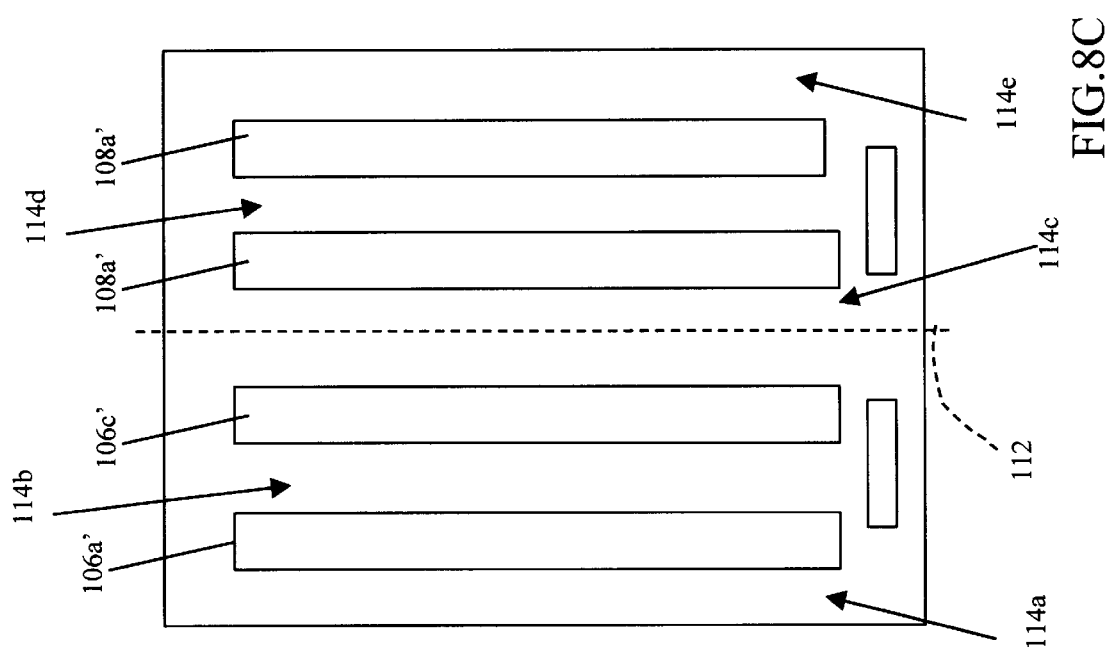

DUAL PAGE MODE DETECTION

BACKGROUND

This invention relates generally to reading machines which are used as part of a remedial reading program to assist individuals with learning disabilities or severe visual impairments or blindness.

Reading machines have been used to improve the educational attainment of individuals with learning disabilities or severe visual impairments or blindness. In general, known reading machines are computer based. Reading machines include specialized software to process an input source document and generate synthetic speech to enable a user to hear the computer read through the document a word, line, sentence, etc. at a time. Often these reading machines include a scanner to provide one technique to input source documents to the reading machine.

Common types of source materials that are scanned into a reading machine include magazines and books. Often the books and/or magazines are arranged on the scanner in a manner such that two pages of the book are scanned in a common scan producing an image file with two pages. When optical character recognition software processes the image file produced from scanning such a book, the optical character recognition software can mistake the two pages of the book for a pair of columns on a single page. This especially becomes a problem when the page itself contain columns.

SUMMARY

According to an aspect of the invention, a method of splitting an image file produced by scanning a document includes determining probable regions of text from an image file that contains an image of a left page and a right page of a document and determining a page boundary between the regions of text. The method also includes splitting the image file about the determined page boundary into two separate image files corresponding to an image of the left hand page and the right hand page.

According to a further aspect of the invention, a computer program product resides on a computer readable medium. The computer program product includes instructions for separating an image file containing a pair of pages into separate image files for each page. The computer program includes instructions for causing a computer to determine probable regions of text of an image file and determine from the probable regions of text a page boundary between the regions of text. The program also includes instructions to cause a computer to split the image file into two separate image files corresponding to an image of the left hand page of the image file and the right hand page of the image file text.

According to a further aspect of the invention, a method of pre-processing an image file for optical character recognition includes separating the image file containing images of a pair of pages into two separate files each containing an image of a single page and deskewing each of the separated image files. The method further includes applying each of the deskewed image files to an optical character recognition software.

According to a still further aspect of the invention, a method of operating a reading system includes scanning a source document to produce an image file containing an image of a left page and a right page of a document. The method also includes determining probable regions of text of the image file, determining from the probable regions of text a page boundary between the regions of text, and splitting the image file into two separate image files corresponding to an image of the left hand page of the image file and the right hand page of the image file.

According to a still further aspect of the invention, a computer program product resides on a computer readable medium. The computer program product separates an image file containing a pair of pages into separate image files of each page. The product also synthesizes speech for the separated image files. The program includes instructions for causing a computer to scan a source document to produce an image file containing an image of a left page and a right page of a document and determine probable regions of text of the image file. The program also includes instructions to determine from the probable regions of text a page boundary between the regions of text and split the image file into two separate image files corresponding to an image of the left hand page of the image file and the right hand page of the image file. The program also uses optical character recognition to separately recognize the text from each image file in order to synthesize speech from each separate page of text.

According to a still further aspect of the invention, a method of performing optical character recognition on an image file comprised of a left side page and a right side page includes determining probable regions of text from the image file and determining a page boundary between the regions of text. The method splits the image file about the determined page boundary into two separate image files corresponding to an image of the left hand page and the right hand page and converts the two separate image files into two blocks of text corresponding to the left page and the right page.

One or more of the following advantages may be provided by one or more aspects of the invention. Often a user places a document on a scanner in such a manner that the scanner scans two pages of a document into a single image file. The various aspects of the invention process the image file to produce two separate image files. Optical character recognition is used to separately recognize the text from each image file. If text files produced from the optical character recognition are sent to a speech synthesizer the portions of the document corresponding to the separate files are read in the correct order. The processing of the image file will insure that text from the right hand page is read after the text from the left hand page.

Often an image file that contains an image of two pages of a document may have text on the page skewed with respect to the text on the other page. It is desirable for improving optical character recognition to deskew the image files so that the text within the image file is perpendicular to the boundary of the page. The composite image file is separated into two separate image files and fed to a deskew filter to produce a deskewed image file. This deskew pre-processing can significantly improve optical character recognition performance. In systems that use the recognized text, it is often useful to have the text organized in pages that correspond to the pages in the original document.

BRIEF DESCRIPTION OF THE DRAWINGS

The foregoing features and other aspects of the invention will be described further in detail by the accompanying drawings, in which:

FIG. 8C is a diagrammatical mapping view of gutters corresponding to the mapping view of FIG. 8B.

FIG. 8D is a diagrammatical views of the page of FIG. 8A split into two separate image files.

DETAILED DESCRIPTION

Figure 1:
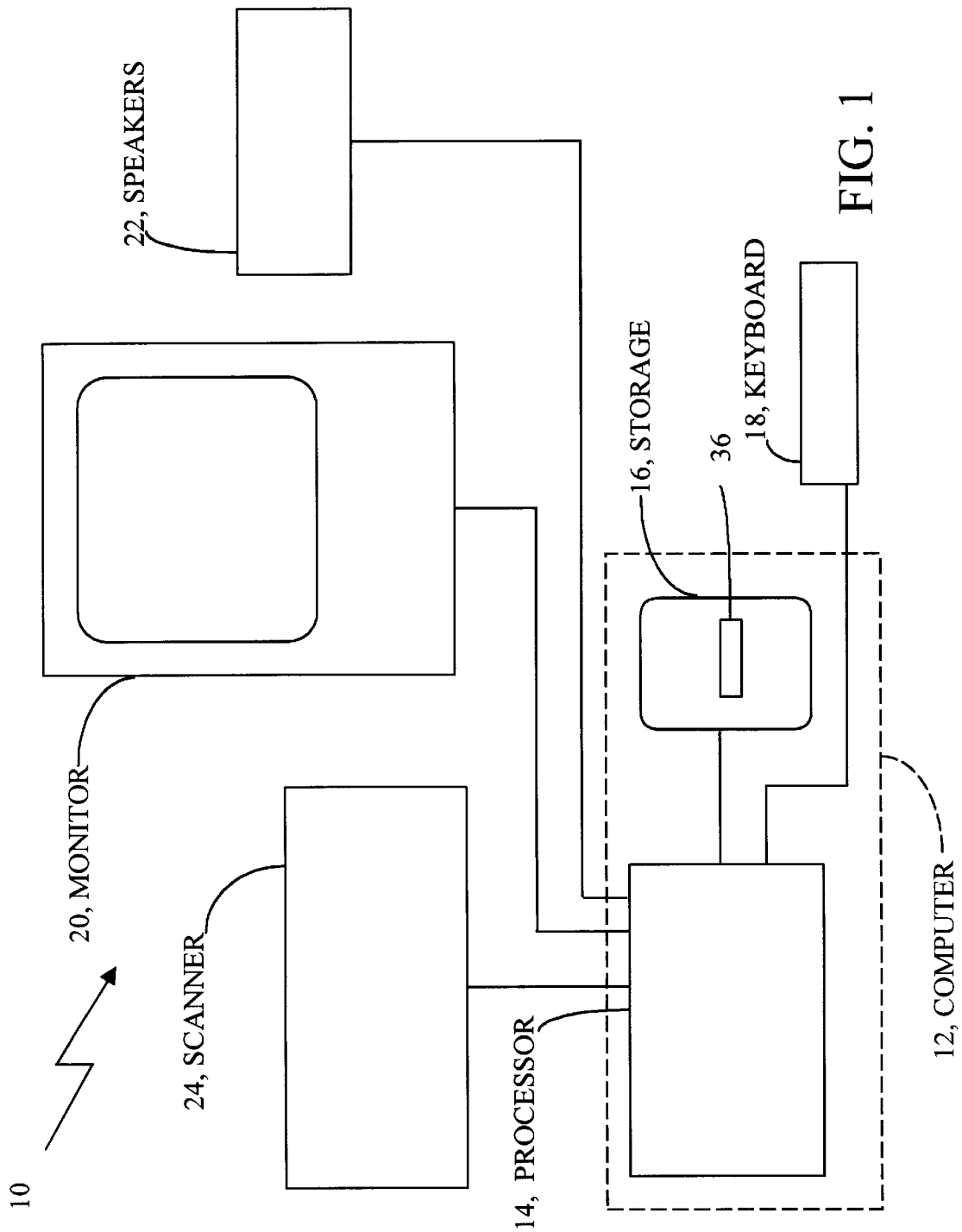
FIG. 1 is a block diagram of a reading system.

Referring now to FIG. 1, a reading machine 10 is shown to include a computer system 12. The computer system 12 is generally a personal computer or can alternatively be another type of computer and typically includes a central processor unit (not shown) that is part of a processor 14. A preferred implementation of the processor 14 is a Pentium® based system from Intel Corporation, Santa Clara, Calif., although other processors could alternatively be used. In addition to the CPU, the processor includes main memory, cache memory and bus interface circuits (not shown). The computer system 12 includes a mass storage element 16, here typically the hard drive associated with personal computer systems.

The reading system 10 also includes a standard PC type keyboard 18, a sound card (not shown), a monitor 20 as well as speakers 22, a pointing device such as a mouse 19 and a scanner 24 all coupled to various ports of the computer system 10 via appropriate interfaces and software drivers (not shown). This type of configuration would usually be used by persons with learning disabilities, whereas, monitor and printing devices would not typically be used by visually impaired persons. The computer system 12 here operates under a WindowsNT® Microsoft Corporation operating system although other systems could alternatively be used.

The system will be described in reference to one used by a dyslexic person or a person with some learning disability. The dual page detection could just as easily be incorporated into a system for a blind person, that is, a system that does not need a monitor and printing device. For blind persons or visually impaired persons often a monitor and pointing device are not used and such blind or visually impaired persons navigate through a document using page numbers or moving forward or backward by page, line, paragraph, etc. using a special keypad or keyboard. No pointing device or monitor are necessary. One technique is described in U.S. patent application Ser. No. 08/884,591 filed Jun. 27, 1997, entitled "READING MACHINE SYSTEM FOR THE BLIND HAVING A DICTIONARY" by Raymond C. Kurzweil et al. and which is incorporated herein by reference.

Resident on the mass storage element 16 is image display and conversion software 30 (FIG. 2) that controls the display of a scanned image provided from scanner 24. In addition, the software 30 permits the user to control various features of the reader by referencing the image representation of the document displayed by the monitor.

Figure 2:
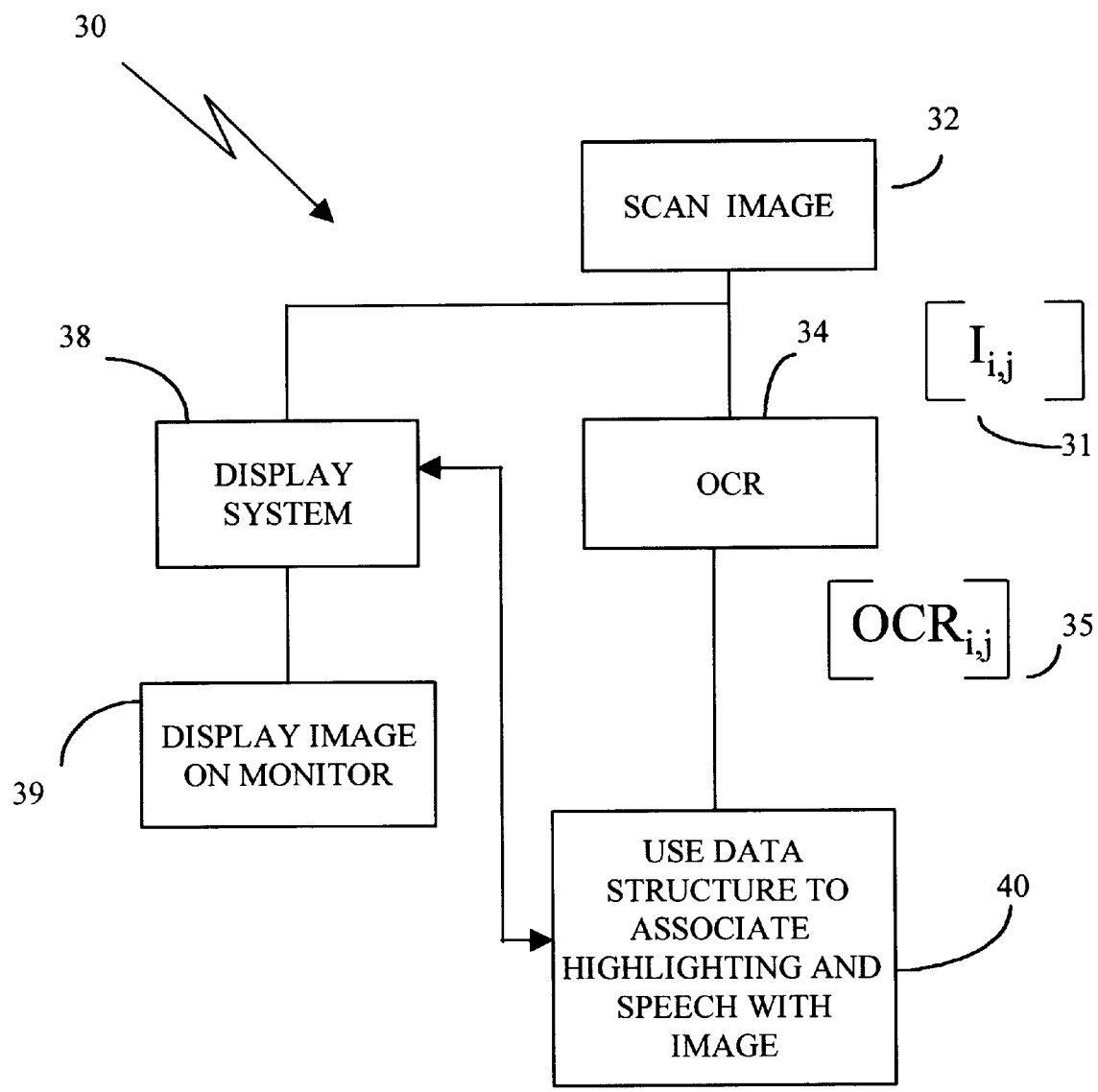
FIG. 2 is a flow chart showing steps used in displaying a scanned image representation of a document for use in the reading system of FIG. 1.

Referring now to FIG. 2, the image display and conversion software 30 scans an input document to provide an image file (step 32). In general, the input document is scanned in a conventional manner and produces an image file 31 which is fed to optical character recognition (OCR) software 34. The OCR software 34 uses conventional optical character recognition techniques on the data provided from the scanned image 32 to produce an output data structure OCR text file 35. Alternatively, a text file or an image-like representations can be used as a source such as a stored bit-mapped version of a document.

The image file 31 is also fed to a display system 38 which in a conventional manner processes the image file to permit it to be displayed 39 on the monitor. As shown, the OCR text file 35 provides an input along with other commands driven by the operating system (not shown) to a module 40 which is used to associate user initiated actions with an image representative of a scanned document. In addition, both the image file 31 and the OCR text file 35 are stored in the reading system for use during the session and can be permanently stored for latter use. The files are stored using generally conventional techniques common to WindowsNT® or other types of operating systems. A preferred technique for the image display and conversion software 30 is described in a copending application Ser. No. 08/883,686 filed on Jun. 27, 1997 entitled "Reading System Displaying Scanned Images with Dual Highlighting" by Raymond C. Kurzweil et al. and incorporated herein by reference.

Figure 3:
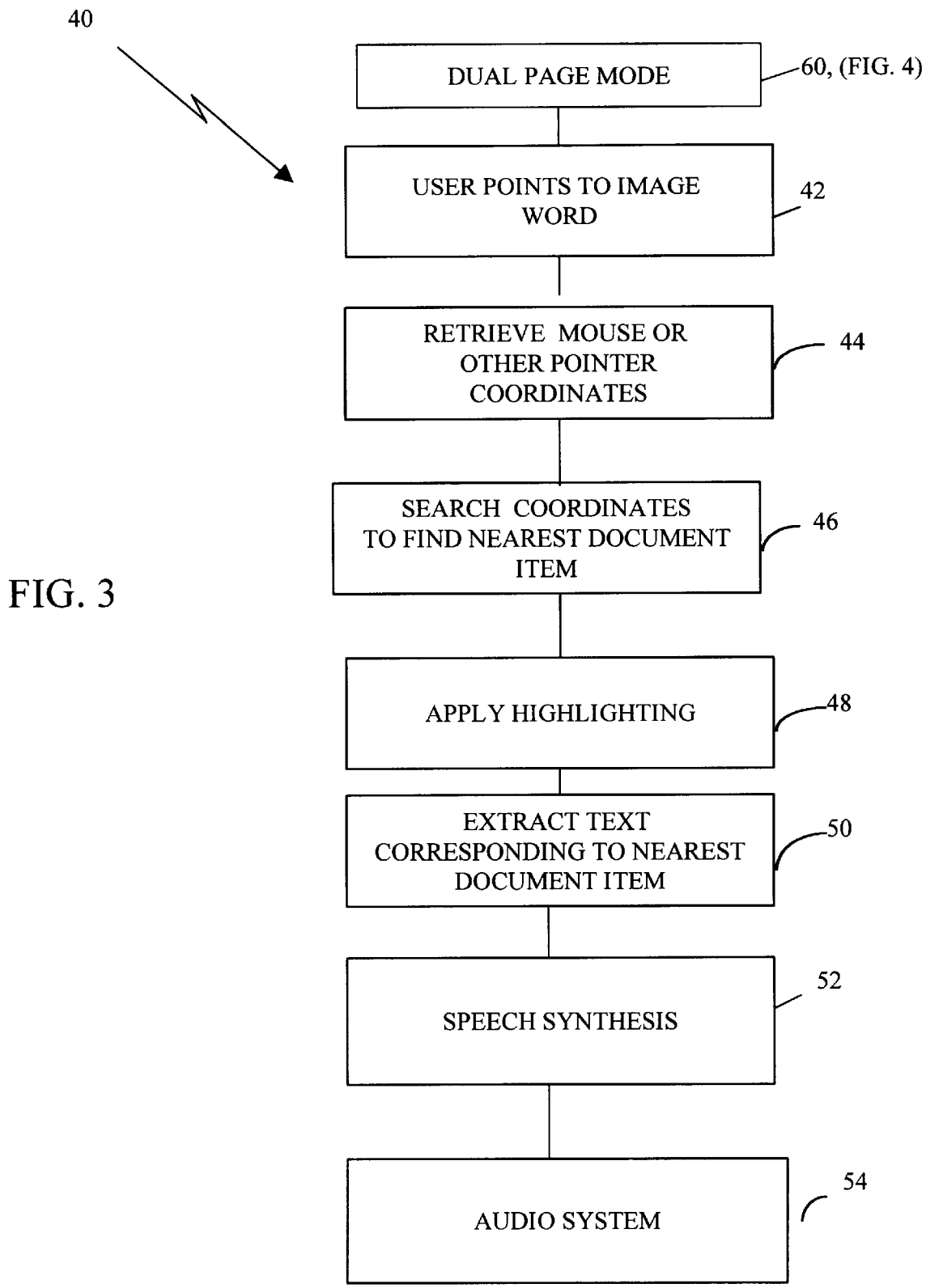
FIG. 3 is a flow chart to associate user selected text on the display of the image representation to optical character recognition generated text to permit synthesis of synthetic speech and highlighting of the image representation.

Referring now to FIG. 3, the user controls operation of the reading system 10 with reference to the image displayed on the monitor 20, as shown by the software module 40. The user can enable a dual page mode 60 for an image file that contains images of two scanned pages.

A user can initiate reading of the scanned document at the beginning of the document by selecting a reading mode. Alternatively, the user can have the document start reading from any point in the document by illustratively pointing 42 to the image representation of an item from the scanned document displayed on the monitor. The document item can be the actual image representation of the scanned document rather than the conventional text file representation. The item can be a single word of text, a line, sentence, paragraph, region and so forth. The user activates a feature to enable the reading machine to generate synthesized speech associated with the selected image representation of the document item.

Preferred searching 46 techniques are described in the above pending application.

After the nearest word or nearest document item has been determined 46 or 46', highlighting is applied 48 to an area associated with the item. The text corresponding to the nearest document item is also extracted 50. The text representation is fed to a speech synthesizer 52 to produced electrical signals corresponding to speech. The electrical signals are fed to the audio system 54 to produce speech corresponding to the nearest document item while the monitor 20 displays the item and highlighting 48 is applied to the item.

Figure 4:
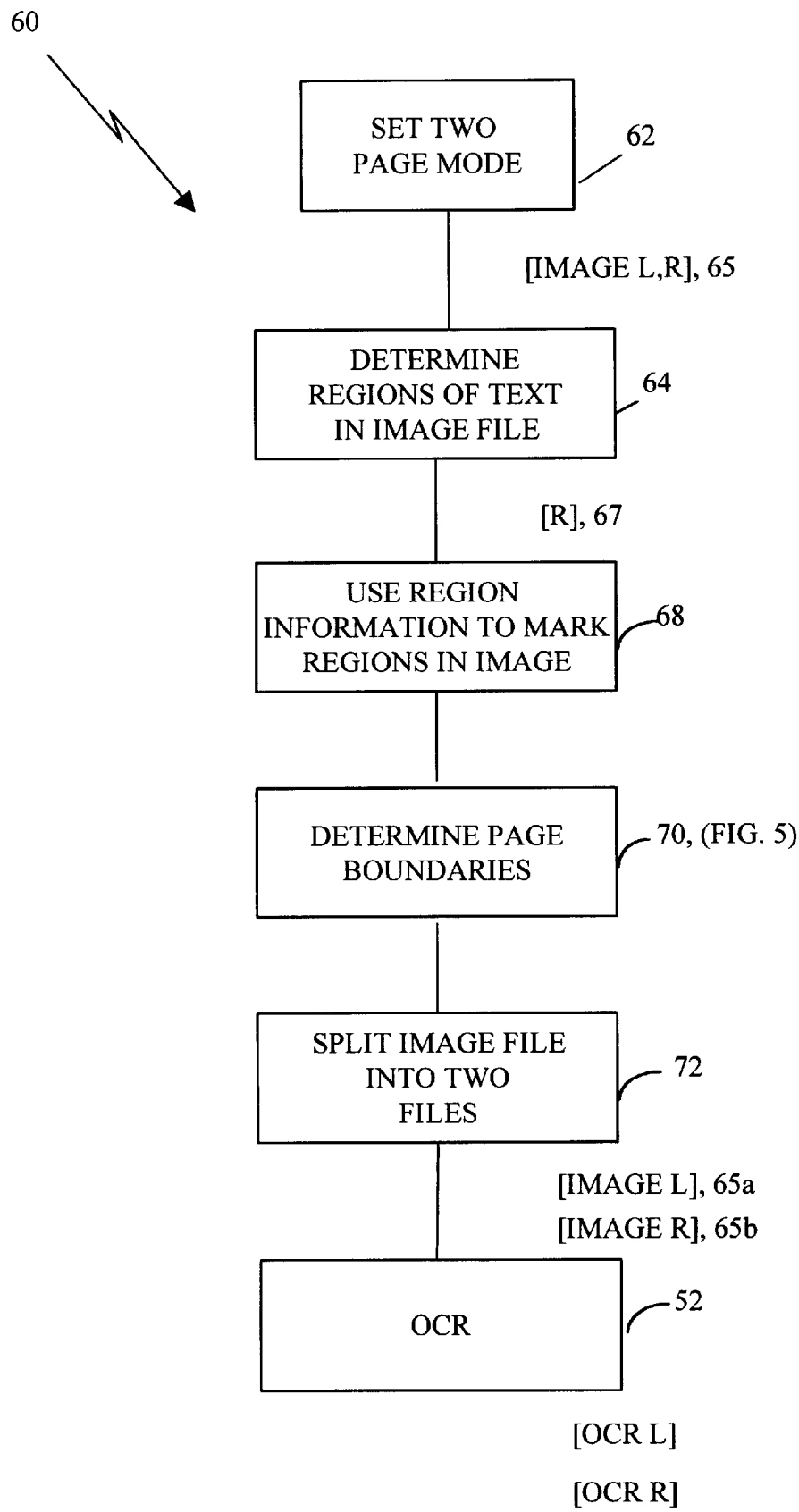
FIG. 4 is a flow chart showing a process to generate synthetic speech for an image file containing dual pages.

Referring now to FIG. 4, a dual page mode filter 60 is shown. The dual page mode filter 60 can be selectively enabled 62 to provide dual page mode processing. Enabling 62 can be accomplished, for example, by selecting a control from a pull-down menu in a graphical user interface (not shown) for a person using a monitor or via a button on a special keypad or other user interface by a blind or visually impaired person.

Often a user places a document on scanner 24 (FIG. 1) in such a manner that the scanner 24 scans two pages of a document into a single image file. If this document were presented to the optical character recognition software for processing and if the resulting OCR text file were fed to the speech synthesizer 52, various portions of the document may be read out of order. This may occur because the optical character recognition software will assume that the image file contains text from a single page, and may mix columns of text such that some text from the right hand page is read before some text from the left hand page.

The scanner produces an image file 65 that contains images of typically the left-side page and the right-side page of the scanned document. The filter 60 processes the image file 65 with region finding 64 software. Such software (available from several commercial sources such as EXPERVISION, INC. 48065 Fremont Blvd. Fremont, Calif. 94538) is sometimes referred to as page segmentation software. It produces region information 67 (R) which is the segmentation software's estimate of regions of probable text in the image file 65. The process 60 uses the region information to mark 68 regions of text in the image file 65.

Alternatively, the image file 65 could be fed to optical character recognition software (not shown in FIG. 4). The optical character recognition software could process the image file 65 and produce an output file containing region information (R) which is the optical character recognition software's estimate of regions of probable text identified from the image file 65. The optical character recognition software may also produce a text file containing the recognized text. However, at this point all that is needed is the region information. Therefore, character recognition and output of a text file is not necessary and in some situations could slow the process.

The process will determine page boundaries 70 by reference to the marked probable text regions in the image. From the page boundaries, the process splits 72 the image file 65 into two separate image files 65a, 65b. One of the image files 65a will correspond to the image of the left page and the other file 65b corresponding to an image of the right page. Each of the image files 65a, 65b is fed to the optical character recognition software 52. In general, the image files 65a, 65b are both fed to the optical character recognition software 80 for generation of corresponding text files "OCRL" and "OCRR." The optical character recognition thus produces "OCRL" and "OCRR" with each of those files containing region information and converted text. Alternatively, the text files "OCRL" and "OCRR" could be streams of text, blocks of text and so forth.

Figure 5:
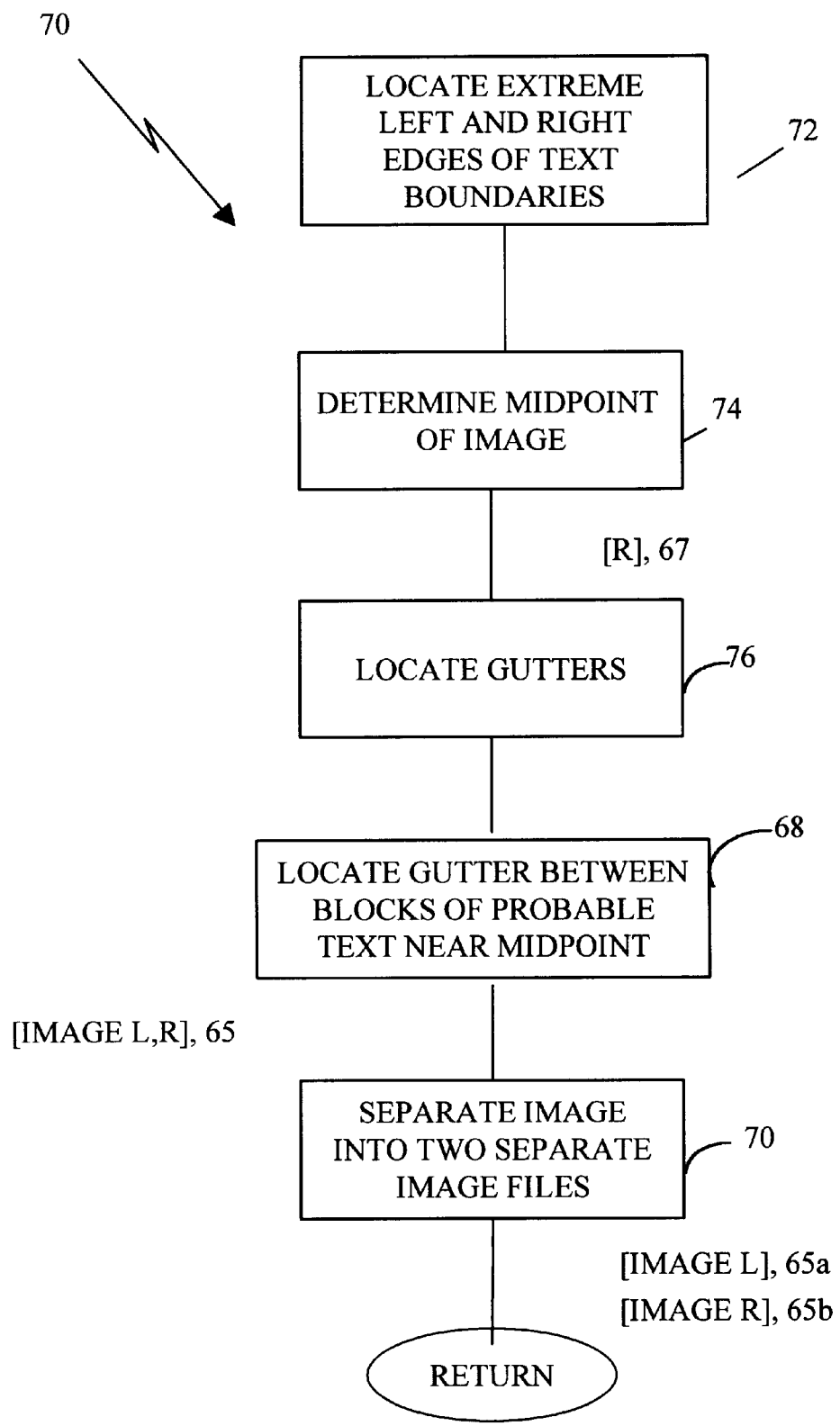
FIG. 5 is a flow chart showing a process to locate boundaries of an image file containing two scanned image pages.

Referring now to FIG. 5, page boundaries are determined 70 by locating extreme left and right edges of text boundaries from the region information that was mapped 68 to the image representation of a page. The left and right edges of the text boundaries are used to determine 74 the expected page boundary by determining the midpoint between extreme left and right edges of text boundaries. The following discussion can also be read in conjunction with illustrations of examples of determining regions and page boundaries, as illustrated in FIGS. 8A–8D, as discussed below.

The page boundary determination process 70 also locates 76 gutters that exist between the region information mapped to the image representation of the page. That is, the optical character recognition software 66 will identify regions that are tightly defined about the probable text. If necessary, these region boxes can be clustered into larger boxes to represent uniform regions of text. Long spaces between these large region boxes correspond to gutters or empty regions that are generally devoid of recognizable text.

Therefore, these gutters are located and marked in an image representation. The process locates 78 a gutter that exists between blocks of probable text. The gutter whose horizontal midpoint is nearest to the expected page boundary, will be considered to be the page boundary between the left and right pages. It should be noted that gutters have two dimensions: height and width. This is because it is possible to have gutters that are broken by a text region which completely crosses the horizontal extent of the gutter. In identifying gutters, sometimes the text regions are imprecise and possibly incorrectly identified. For example, sometimes two pages have top lines such that the right edge of the line on the left hand page and the left edge of the line on the right hand page are close enough that OCR software considers those lines to be part of one region. Therefore, the process 76 disregards text regions whose widths are greater than six times their height which tends to avoid this particular problem. The process 76 also disregards text regions whose width is greater than three quarters of the distance between the extreme left edge of text and the extreme right edge of text in the image.

The process 70 separates the image file 65 into two separate image files, 65a, 65b corresponding to respectively, the left page in the image file 65 and the right page in the image file 65. Once the process had identified the appropriate gutter, the process takes the horizontal midpoint of the gutter as the correct spot to divide the image in two. That division is straightforward. That is, portions of the image that are to the left of the division ordinate will be written out into the left page file, whereas, those portions on the division ordinate or to its right are written out into the right page file.

Figure 6:
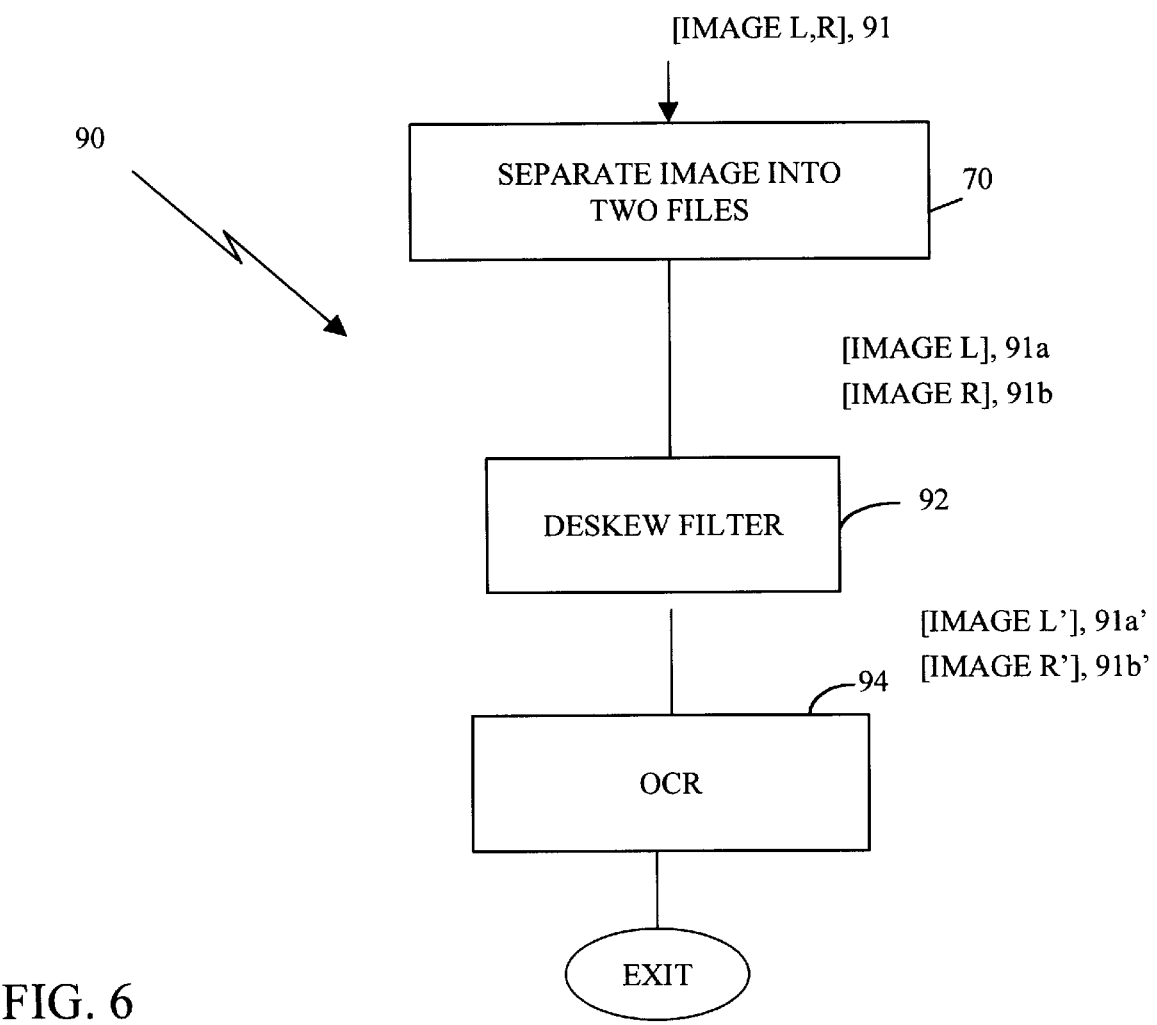
FIG. 6 is a flow chart of a process to deskew an image file containing two pages.

Referring now to FIG. 6, often an image file 65 which contains an image of two pages of a document may have text on the page skewed with respect to the text on the other page. It is desirable for improving optical character recognition to deskew the image files so that the text within the image file is perpendicular to the boundary of the page. The composite image file can be fed to the dual page filter 60 to separate the composite image file 91 into two separate image files 91a, 91b. Each image file can be fed to a deskew filter 92 to produce a deskewed image files 91a' and 91b ', respectively. These files can be fed to the optical character recognition software 94. This deskew preprocessing can significantly improve optical character recognition performance.

Figure 7:
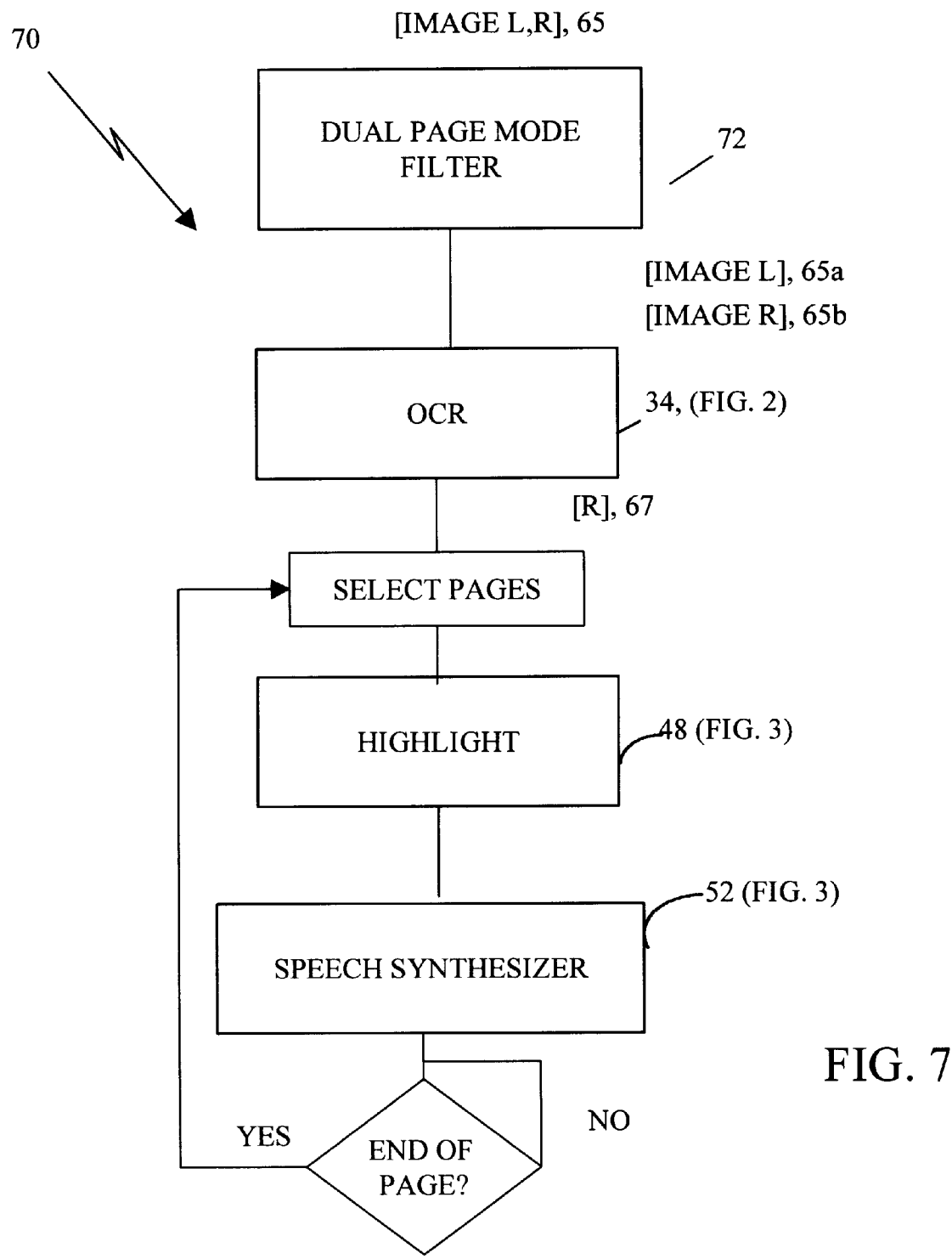
FIG. 7 is a flow chart of a process to generate synthetic speech and highlight an image for an image file containing a pair of pages that are split into separate image files.

Referring now to FIG. 7, the reading system 10 can synthesize speech for an image file 65 that contains a scanned left and right page by use of the dual page mode filter 60. The image file 65 is fed to the dual page mode filter 60 which produces the two separate image files 65a, 65b corresponding to the left page and the right page. The dual mode process 60 can send both image files to the optical character recognition software 34 and can selects 95 the text file for the left hand page to feed, highlight 36 and synthesize speech for 52, as was generally described above with FIGS. 2 and 3. After the speech synthesizer 52 has reached 97 the end of left hand page, the process 60 can select the text file for the right hand image file 65b to highlight 48 and synthesize speech for 52.

Figure 8B:
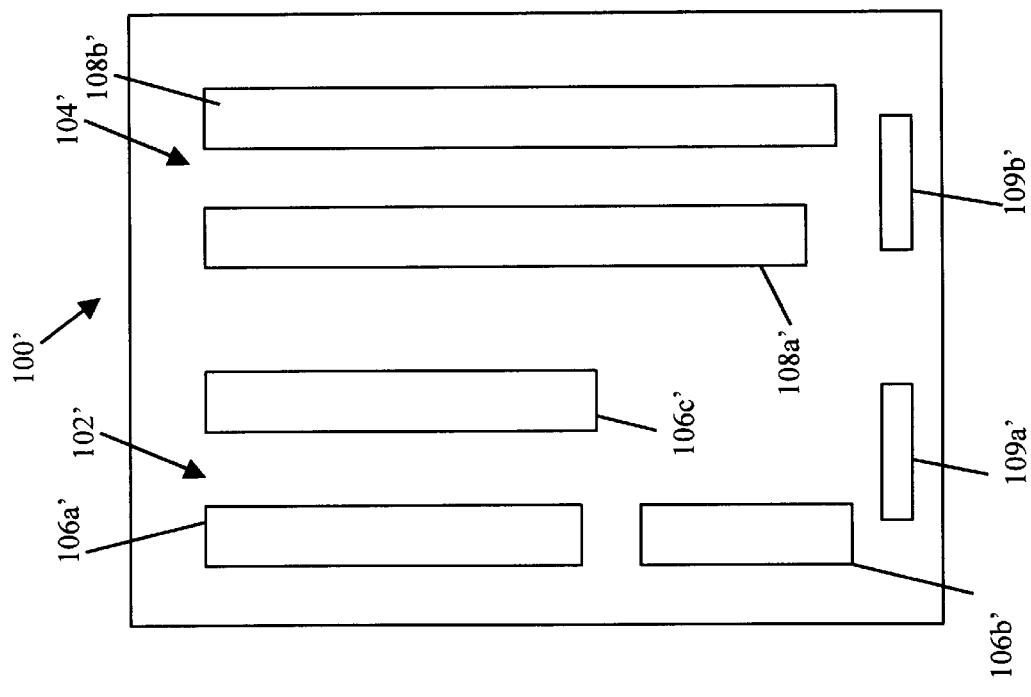
FIG. 8B is a diagrammatical mapping view of probable text regions for the image of FIG. 8A.
Figure 8A:
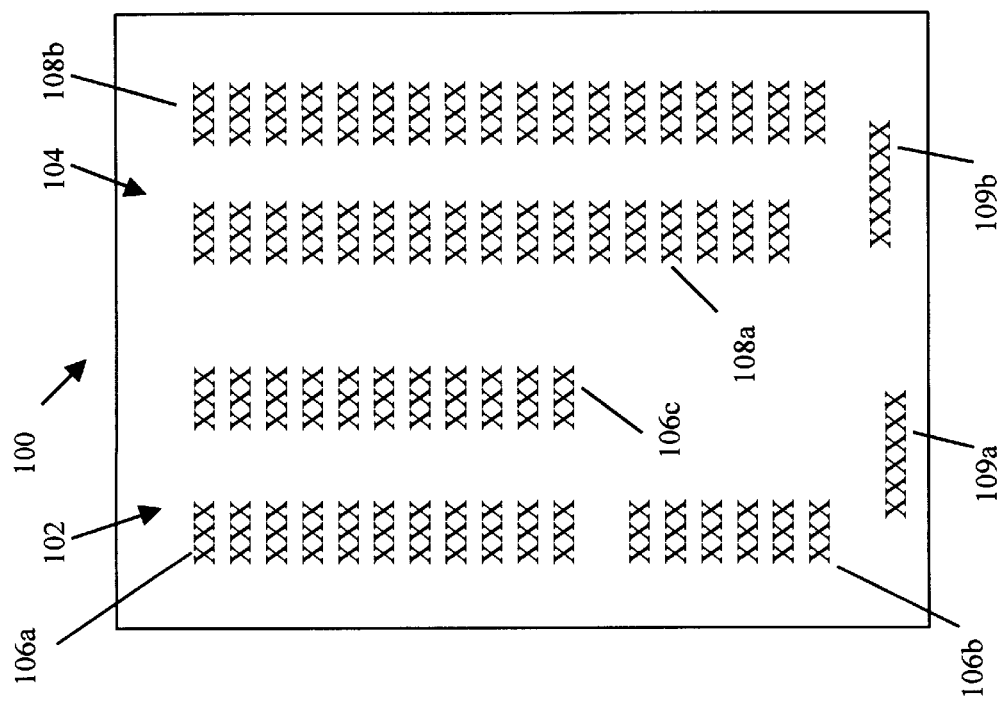
FIG. 8A is a diagrammatical view of a scanned image containing two pages.

Referring now to FIG. 8A, a portion of a document 100 is shown having two pages 102, 104. Here each of the pages 102, 104 have sections of text which are arranged in a pair of columns. Thus, for example, page 102 includes sections 106a and 106b which are arranged in a first column and section 106c which is arranged in a second column. Similarly, page 104 includes sections 108a and 108b arranged in separate columns. Often the pages, as scanned, may include headers (not shown), as well as, footers, here 109a, 109b, respectively on pages 102, 104.

Referring now to FIG. 8B, the optical character recognition software produces region information that locates regions of probable text. This region information is used to map or mark the probable text regions in the image. Thus, as shown in FIG. 8B, a map 100' of the document 100 (FIG. 8A) has the regions 106a'–106c ' mapped to correspond to the text regions 106a–106c of page 102 (FIG. 8A). Similarly, regions 108a' and 108b' are marked to correspond to the regions 108a, 108b of page 104 (FIG. 8A). The regions 109a', 109b' are also marked to correspond to the footers 109a, 109b (FIG. 8A).

As shown in FIG. 8C, the map 100' has the regions of FIG. 8B clustered to form larger regions 106a", 106c " and 108a" and 108b ". The middle 112 of the document portion 100 is located and marked. Gutters 114a–114e are also located between the identified regions of text 106a'–106c ' and 108a'–108b ' (FIG. 8B). These gutters 114a–114e correspond to regions where no recognizable text is present in the image file 65. The gutter 114c is shown coincident or including the middle 112 of the document 100 and thus is considered to be the boundary between two scanned pages. The middle 112 is used to separate the page 102 into a left page 102a (FIG. 8D) and a right page 104b (FIG. 8D) corresponding to page 104 (FIG. 8A).

The mappings 102' and 104' for the separate pages 102a, 104b are used to produce the image files 65a, 65b from the dual page image file 65. This can be accomplished by using region information produced for the dual page file 65. That is, portions of the image that are to the left of the division ordinate will be written out into the left page file, those portions on the division ordinate or to its right are written out into the right page file.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of splittting an image file produced by scanning a document, the method comprises:
    determining probable regions of text from an image file containing an image of a left page and a right page of a document;
    determining a page boundary between the regions of text; and
    splitting the image file about the determined page boundary into two separate image files corresponding to an image of the left hand page and the right hand page.

2. The method of claim 1 wherein determining a page boundary further comprises determining an expected page boundary.

3. The method of claim 2 wherein determining a page boundary further comprises locating gutters between regions of probable text.

4. The method of claim 3 wherein determining a page boundary further comprises locating a gutter between regions of probable text that is coincident with the expected page boundary.

5. The method of claim 3 wherein determining regions of probable text further comprises
    feeding image file to a region finding process to produce regions of recognizable text.

6. The method of claim 3 wherein determining regions of probable text further comprises:
    clustering the regions into larger regions of probable text; and wherein locating gutters comprises
    identifying the gutters as regions void of text between the regions and/or larger regions of recognizable text.

7. The method of claim 1 wherein determining regions of probable text further comprising feeding image file to a region finding process to produce regions of recognizable text.

8. The method of claim 7 wherein determining regions of probable text further comprises clustering the regions into larger regions of probable text.

9. A computer program product residing on a computer readable medium for separating an image file containing a pair of pages into separate image files of each page comprises instructions for causing a computer to:
    determine probable regions of text of an image file;
    determine from the probable regions of text a page boundary between the regions of text; and
    split the image file into two separate image files corresponding to an image of the left hand page of the image file and the right hand page of the image file text.

10. The computer program product of claim 9 wherein instructions that cause a computer to determine a page boundary further comprises instructions that cause the computer to: determine an expected page boundary.

11. The computer program product of claim 9 wherein instructions that cause a computer to
    determine a page boundary further comprises instructions that cause a computer to locate gutters between regions of probable text.

12. The computer program product of claim 11 wherein instructions that cause a computer to determine a page boundary further comprises instructions that cause a computer to locate a gutter between blocks of probable text that is coincident with the middle of the image file.

13. The computer program product of claim 12 further comprising instructions for causing a computer to:
    feed the left image file to an optical character recognition process to produce a OCR file for the left page.

14. The computer program product of claim 12 further comprising instructions for causing a computer to:
    synthesize speech from the OCR file for the left page.

15. The computer program product of claim 12 further comprising instructions for causing a computer to:
    feed the right image file to an optical character recognition process to produce an OCR file for the right page.

16. The computer program product of claim 12 further comprising instructions for causing a computer to:
    synthesize speech from the OCR file for the right page.

17. A method of pre-processing an image file for optical character recognition comprises:
    separating the image file containing a pair of pages of the image into two separate files of each page of the image;
    deskewing each of the separated image files; and
    applying each of the deskewed image file to an optical character recognition software.

18. The method of claim 17 wherein separating further comprises:

determining probable regions of text from the image file;

determining an expected page boundary between the probable regions of text; and splitting the image file about the expected page boundary into two separate image files corresponding to an image of the left hand page and the right hand page.

19. The method of claim 18 wherein determining regions of probable text further comprising feeding the image file to an optical character recognition process to produce the regions of probable text.

20. The method of claim 17 wherein determining a page boundary further comprises locating gutters between regions of probable text.

21. The method of claim 20 wherein determining a page boundary further comprises locating a gutter between regions of probable text that is coincident with the expected page boundary.

22. A method of operating a reading system comprises:

scanning a source document to produce an image file containing an image of a left page and a right page of a document;

determining probable regions of text of the image file;

determining from the probable regions of text a page boundary between the regions of text; and splitting the image file into two separate image files corresponding to an image of the left hand page of the image file and the right hand page of the image file.

23. The method of claim 22 wherein determining a page boundary further comprises determining the middle of the image file as scanned.

24. The method of claim 23 wherein determining a page boundary further comprises locating gutters between regions of probable text.

25. The method of claim 24 wherein determining a page boundary further comprises locating a gutter between blocks of probable text that is coincident with the middle of the image file.

26. The method of claim 22 further comprising feeding the left image file to an optical character recognition process to produce a OCR file for the left page.

27. The method of claim 26 further comprising synthesizing speech from the OCR file for the left page.

28. The method of claim 26 further comprising feeding the right image file to an optical character recognition process to produce an OCR file for the right page.

29. The method of claim 28 further comprising synthesizing speech from the OCR file for the right page.

30. A computer program product residing on a computer readable medium for separating an image file containing a pair of pages into separate image files of each page and for synthesizing speech for the separated image files comprises instructions for causing a computer to:

scan a source document to produce an image file containing an image of a left page and a right page of a document;

determine probable regions of text of the image file;

determine from the probable regions of text a page boundary between the regions of text;

split the image file into two separate image files corresponding to an image of the left hand page of the image file and the right hand page of the image file;

produce separate OCR files from the image file for the left and right pages;

synthesize speech for the separate OCR files.

31. The computer program product of claim 30 wherein instructions that cause a computer to determine a page boundary further comprises instructions that cause the computer to determine an expected page boundary.

32. The computer program product of claim 31 wherein instructions that cause a computer to determine a page boundary further comprises instructions that cause a computer to:

locate gutters between regions of probable text.

33. The computer program product of claim 31 wherein instructions that cause a computer to determine a page boundary further comprises instructions that cause a computer to locate a gutter between blocks of probable text that is coincident with the middle of the image file.

34. A method of performing optical character recognition on an image file comprised of a left side page and a right side page, the method comprising:

determining probable regions of text from the image file;

determining a page boundary between the regions of text;

splitting the image file about the determined page boundary into two separate image files corresponding to an image of the left hand page and the right hand page;

converting the two separate image files into two text files corresponding to the left page and the right page.

35. The method of claim 34 wherein determining a page boundary further comprises determining an expected page boundary.

36. The method of claim 35 wherein determining a page boundary further comprises locating gutters between regions of probable text.

37. The method of claim 35 wherein converting further comprises:

applying each image file to an optical character recognition process to produce the two text files.

38. The method of claim 34 further comprising feeding the image file corresponding to the left page to an optical character recognition process to produce a OCR file for the left page; and then feeding the image file corresponding to the right page to an optical character recognition process to produce a OCR file for the right page.

\* \* \* \* \*